(12) United States Patent
Voss

(10) Patent No.: US 11,784,957 B2
(45) Date of Patent: *Oct. 10, 2023

(54) MESSAGING SYSTEM

(71) Applicant: Snap Inc., Santa Monica, CA (US)

(72) Inventor: Jeremy Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,683

(22) Filed: Feb. 24, 2022

(65) Prior Publication Data

US 2022/0239616 A1 Jul. 28, 2022

Related U.S. Application Data

(63) Continuation of application No. 16/042,705, filed on Jul. 23, 2018, now Pat. No. 11,277,368.

(51) Int. Cl.
*H04L 51/42* (2022.01)
*H04L 51/046* (2022.01)
*H04L 51/10* (2022.01)
*H04L 51/224* (2022.01)
*H04L 51/234* (2022.01)
*H04L 51/212* (2022.01)

(52) U.S. Cl.
CPC .......... *H04L 51/42* (2022.05); *H04L 51/046* (2013.01); *H04L 51/10* (2013.01); *H04L 51/224* (2022.05); *H04L 51/234* (2022.05); *H04L 51/212* (2022.05)

(58) Field of Classification Search
CPC .......... H04L 51/12; H04L 51/24; H04L 51/34
See application file for complete search history.

(56) References Cited

U.S. PATENT DOCUMENTS

| | | | |
|---|---|---|---|
| 7,013,325 B1 * | 3/2006 | Vivian | G09B 5/00 434/323 |
| 7,849,213 B1 * | 12/2010 | Borghetti | H04L 63/105 709/217 |
| 8,166,118 B1 * | 4/2012 | Borghetti | H04L 51/212 709/206 |
| 9,210,113 B2 * | 12/2015 | Matlija | H04L 51/216 |
| 10,218,668 B1 * | 2/2019 | Karp | H04L 51/212 |
| 10,425,422 B1 * | 9/2019 | Ledet | G06F 21/606 |
| 10,693,825 B2 * | 6/2020 | Iyer | H04L 51/04 |
| 10,726,603 B1 * | 7/2020 | Al Majid | G06F 3/04845 |
| 10,757,059 B2 * | 8/2020 | Ali | H04L 51/063 |

(Continued)

OTHER PUBLICATIONS

"U.S. Appl. No. 16/042,705, Advisory Action dated Sep. 28, 2020", 7 pgs.

(Continued)

*Primary Examiner* — Douglas B Blair
(74) *Attorney, Agent, or Firm* — Schwegman Lundberg & Woessner, P.A.

(57) ABSTRACT

The present invention relates to a messaging system configured to: receive a request to generate a message at a first client device; cause display of a message notification within an interface of a second client device, wherein the message was addressed to a recipient of the second client device; receive a request to un-send the message from the first client device; and remove the message notification from the interface at the second client device in response to the request to un-send the message, according to some example embodiments.

20 Claims, 11 Drawing Sheets

(56) References Cited

U.S. PATENT DOCUMENTS

| | | | | |
|---|---|---|---|---|
| 10,764,228 | B1* | 9/2020 | Donohue | H04L 51/043 |
| 11,012,397 | B2* | 5/2021 | Iyer | H04L 51/42 |
| 11,277,368 | B1* | 3/2022 | Voss | H04L 51/42 |
| 11,284,145 | B2* | 3/2022 | Lyons | H04N 21/23418 |
| 11,323,399 | B2* | 5/2022 | Everton | H04L 51/212 |
| 11,444,897 | B2* | 9/2022 | Jolly | H04L 63/0428 |
| 2004/0078439 | A1* | 4/2004 | Staack | H04M 3/53 709/206 |
| 2005/0124360 | A1* | 6/2005 | Choi | H04M 1/72436 455/466 |
| 2006/0184635 | A1* | 8/2006 | Owen | H04L 51/212 709/206 |
| 2008/0317228 | A1* | 12/2008 | Kay | G06Q 30/014 379/201.01 |
| 2009/0100497 | A1* | 4/2009 | Goldberg | H04L 51/234 726/1 |
| 2010/0111275 | A1* | 5/2010 | Varma | H04M 3/42 379/133 |
| 2010/0149300 | A1* | 6/2010 | Zubas | H04M 1/72469 348/14.06 |
| 2011/0047222 | A1* | 2/2011 | Farrell | H04L 51/04 709/206 |
| 2013/0080543 | A1* | 3/2013 | Jang | H04L 51/212 709/206 |
| 2014/0297786 | A1* | 10/2014 | Caskey | H04L 51/00 709/217 |
| 2015/0188870 | A1* | 7/2015 | Sharp | H04L 51/42 715/752 |
| 2015/0302041 | A1* | 10/2015 | Veret | G06F 16/2365 707/689 |
| 2017/0099246 | A1* | 4/2017 | Ali | H04L 51/063 |
| 2018/0033019 | A1* | 2/2018 | Mora | G06Q 50/01 |
| 2018/0054414 | A1* | 2/2018 | LeVasseur | H04L 51/234 |
| 2018/0205686 | A1* | 7/2018 | Jolly | H04L 51/212 |
| 2019/0163333 | A1* | 5/2019 | Kogan | G06F 3/0484 |
| 2019/0325156 | A1* | 10/2019 | Du | G06F 16/2379 |
| 2019/0379622 | A1* | 12/2019 | Iyer | H04L 65/1016 |
| 2020/0382460 | A1* | 12/2020 | Iyer | H04L 65/1016 |
| 2021/0036977 | A1* | 2/2021 | Everton | H04L 51/212 |
| 2021/0273902 | A1* | 9/2021 | Iyer | H04L 51/42 |

OTHER PUBLICATIONS

"U.S. Appl. No. 16/042,705, Final Office Action dated Jan. 14, 2021", 8 pgs.

"U.S. Appl. No. 16/042,705, Final Office Action dated May 21, 2020", 8 pgs.

"U.S. Appl. No. 16/042,705, Final Office Action dated Aug. 10, 2021", 10 pgs.

"U.S. Appl. No. 16/042,705, Final Office Action dated Sep. 10, 2020", 8 pgs.

"U.S. Appl. No. 16/042,705, Non Final Office Action dated Feb. 12, 2020", 9 pgs.

"U.S. Appl. No. 16/042,705, Non Final Office Action dated Apr. 29, 2021", 11 pgs.

"U.S. Appl. No. 16/042,705, Non Final Office Action dated Aug. 7, 2020", 8 pgs.

"U.S. Appl. No. 16/042,705, Notice of Allowance dated Nov. 4, 2021", 8 pgs.

"U.S. Appl. No. 16/042,705, Response filed Mar. 15, 2021 to Final Office Action dated Jan. 14, 2021", 10 pgs.

"U.S. Appl. No. 16/042,705, Response filed May 12, 2020 to Non Final Office Action dated Feb. 12, 2020", 12 pgs.

"U.S. Appl. No. 16/042,705, Response filed May 29, 2020 to Final Office Action dated May 21, 2020", 11 pgs.

"U.S. Appl. No. 16/042,705, Response filed Jul. 26, 2021 to Non Final Office Action dated Apr. 29, 2021", 12 pgs.

"U.S. Appl. No. 16/042,705, Response filed Aug. 13, 2020 to Non Final Office Action dated Aug. 7, 2020", 10 pgs.

"U.S. Appl. No. 16/042,705, Response filed Sep. 16, 2020 to Final Office Action dated Sep. 10, 2020", 9 pgs.

"U.S. Appl. No. 16/042,705, Response filed Oct. 11, 2021 to Final Office Action dated Aug. 10, 2021", 10 pgs.

"U.S. Appl. No. 16/042,705, Response filed Dec. 10, 2020 to Advisory Action dated Sep. 28, 2020", 10 pgs.

Orland, Kathleen, "Making the Most Out of Microsoft Office—Outlook Message Recall", http://kathleennorlanoutlookmvp.blogspot.com/2012/06/outlook-message-recall.html, Jun. 6, 2012, 4 pgs.

* cited by examiner

400

RECEIVING, AT A SECOND CLIENT DEVICE, A MESSAGE GENERATED AT A FIRST CLIENT DEVICE
402

CAUSING DISPLAY OF A MESSAGE NOTIFICATION WITHIN AN INTERFACE AT THE SECOND CLIENT DEVICE
404

RECEIVING A REQUEST TO UN-SEND THE MESSAGE FROM THE FIRST CLIENT DEVICE
406

REMOVING THE MESSAGE NOTIFICATION FROM THE INTERFACE AT THE SECOND CLIENT DEVICE
408

```
500
```
STORING THE MESSAGE AT A MEMORY LOCATION ASSOCIATED WITH THE SECOND CLIENT DEVICE AT A SERVER
502
DELETING THE MESSAGE FROM THE MEMORY LOCATION ASSOCIATED WITH THE SECOND CLIENT DEVICE IN RESPONSE TO THE REQUEST TO UN-SEND THE MESSAGE FROM THE FIRST CLIENT DEVICE
504
*FIG. 5*

600

CAUSING DISPLAY OF THE MESSAGE NOTIFICATION AT A POSITION AMONG A SET OF MESSAGES WITHIN A MESSAGING INTERFACE AT THE SECOND CLIENT DEVICE
602

REMOVING THE MESSAGE NOTIFICATION FROM THE POSITION AMONG THE SET OF MESSAGES WITHIN THE MESSAGING INTERFACE IN RESPONSE TO THE REQUEST TO UN-SEND THE MESSAGE
604

CAUSING DISPLAY OF A SECOND MESSAGE NOTIFICATION AMONG THE SET OF MESSAGES IN RESPONSE TO THE REMOVING THE MESSAGE NOTIFICATION
606

FIG. 6

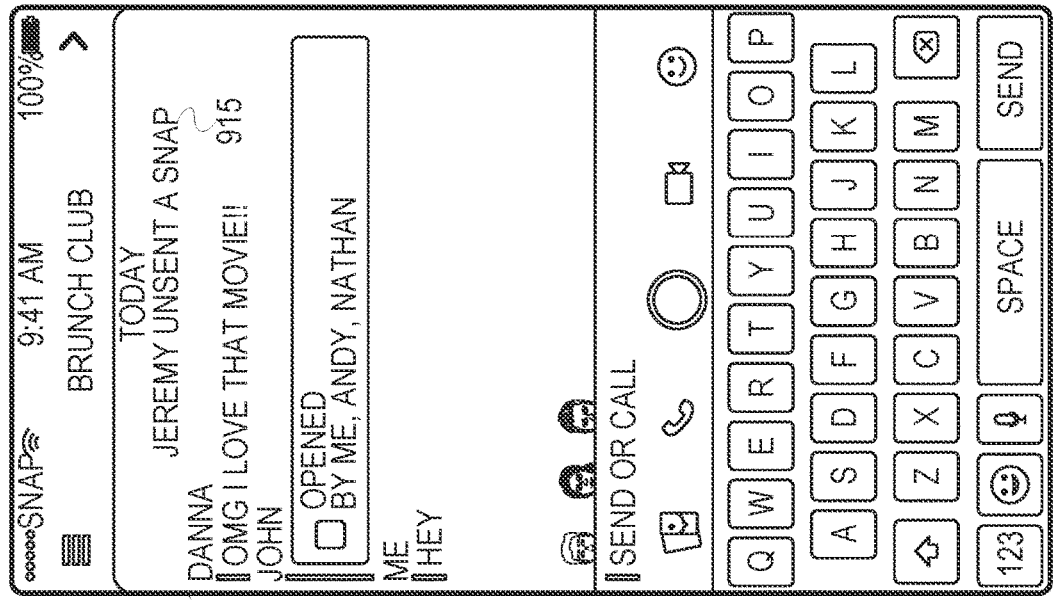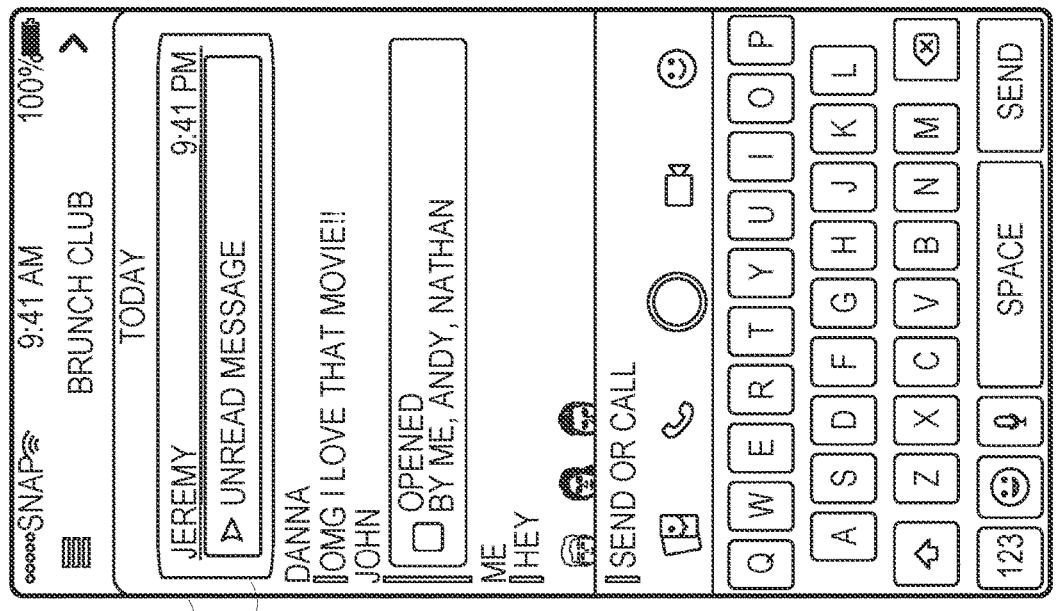
FIG. 9

MESSAGING SYSTEM

CROSS-REFERENCE TO RELATED APPLICATION

This application is a continuation of U.S. patent application Ser. No. 16/042,705, filed Jul. 23, 2018, which is incorporated by reference herein in its entirety.

TECHNICAL FIELD

Embodiments of the present disclosure relate generally to messaging services, and more particularly, to systems for canceling transmission of messages sent from a client device.

BACKGROUND

Messaging application have been published by a variety of developers that enable users to quickly and efficiently communicate with one another by sending messages. For example, a user may send a message that includes media content, such as images, videos, audio recordings, text files, and the like. Recipients of the message may thereby view the contents of the message at their respective devices.

In some situations, a user that has sent a message may want to "un-send" the message. For example, the user may have sent sensitive content to an incorrect recipient, sent a message that contains an error, or mistakenly sent a message altogether.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 5 is a flowchart illustrating a method for "un-sending" a message, according to certain example embodiments.

FIG. 6 is a flowchart illustrating a method for "un-sending" a message, according to certain example embodiments.

FIG. 9 is an interface diagram depicting a messaging interface, according to certain example embodiments.

DETAILED DESCRIPTION

Figure 1:
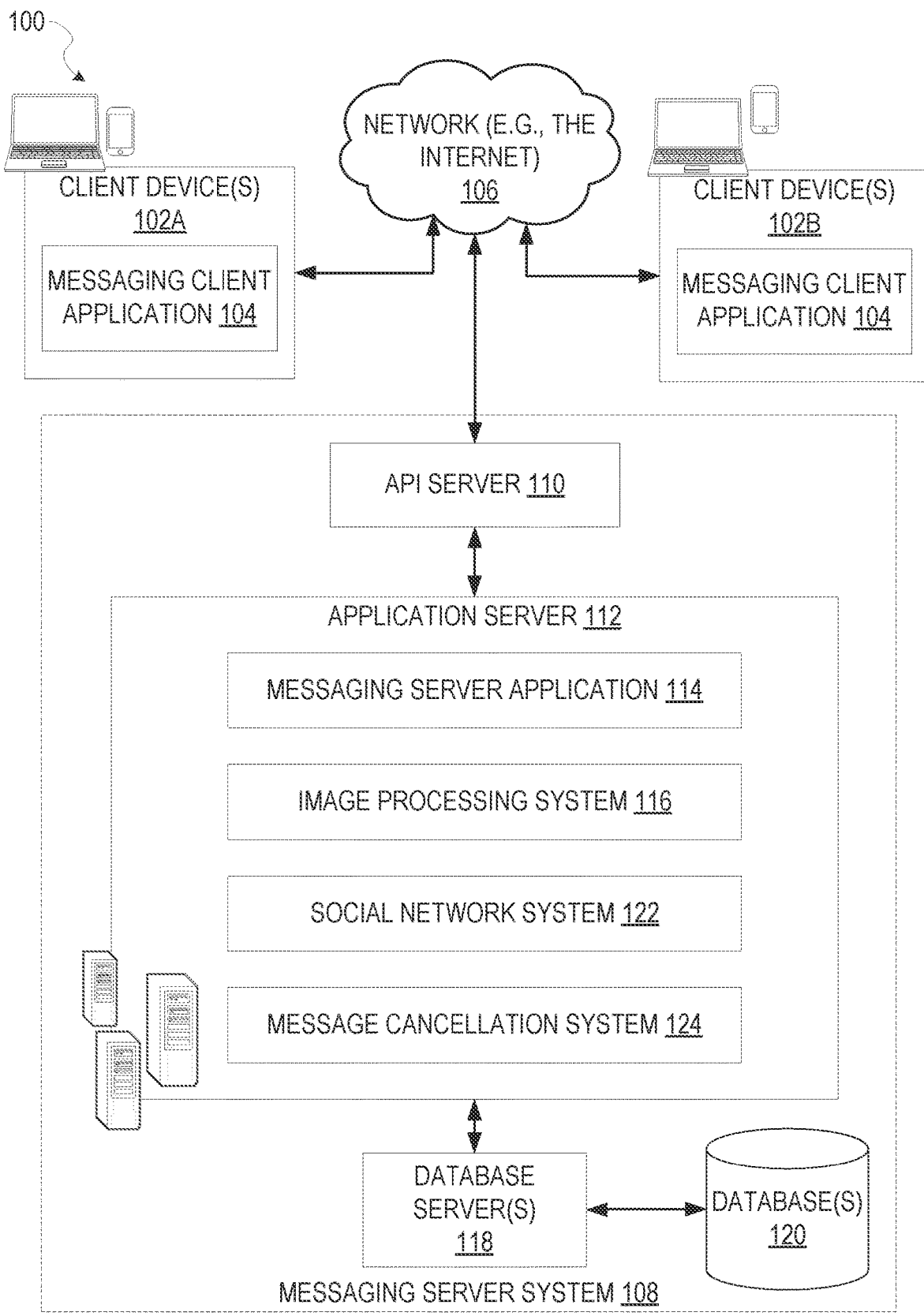
FIG. 1 is a block diagram showing an example messaging system for exchanging data (e.g., messages and associated content) over a network in accordance with some embodiments, wherein the messaging system includes a messaging system.

This disclosure provides a mechanism in messaging applications to "un-send" a message sent from a sender to one or more recipients. The present disclosure thus relates to improvements to systems, methods, and interfaces, to enable a user to un-send a message that has been sent to one or more recipients.

A messaging system according to one embodiment of the disclosure performs operations that include receiving a request to generate a message addressed to one or more recipients from a user of a first client device (e.g., a sending device), and in response to generating the message addressed to one or more recipients at the sending device, causing display of a message notification within an interface displayed to each of the one or more recipients on respective client devices receiving the messages. For example, the interface may include a display of a message feed that contains a list of message identifiers that identify corresponding messages. Each message identifier may comprise a display of an identifier of the sender, as well as message attributes such as an indication of a time that the message was sent, as well as a presentation of content of the message.

The user of the sending client device may then provide a request to "un-send" the message through a messaging interface displayed at the sending device. In some embodiments, the request to un-send the message may comprise a selection of an identifier of the message, and an identification of at least a portion of the one or more recipients of the message. For example, the user may provide the selection of the identifier of the message from a message feed displayed at the sending device. In response to receiving the selection of the identifier of the message, the messaging system generates and presents a display of one or more messaging options that include an option to un-send the message, and a presentation of messaging addresses corresponding to each of the one or more recipients of the message. The user may thereby select the option to un-send the message, and provide the identification of the portion of the one or more recipients based on selection of messaging addresses.

In response to receiving the request to un-send the selected message, a mechanism for retracting messages associated with the messaging system removes the message notification corresponding to the selected message from messaging interfaces presented at client devices associated with the portion of the one or more recipients identified by the user in the request to un-send the message. The messaging system may then clear data corresponding to the message from memory locations of the devices associated with the portion of the one or more recipients, as well as from memory locations associated with the one or more recipients at a central server or database.

In some embodiments, in response to receiving the request to un-send the message, the messaging system generates and causes display of a message cancellation notification at the interfaces displayed to the portion of the one or more recipients, wherein the message cancellation notification includes a display of an identifier of the user (e.g., the sender of the message), and an indication that the user cancelled the message.

In some embodiments, the messaging system may detect whether or not the message has been opened or otherwise accessed by the one or more recipients. In response to detecting one or more of the recipients opening or accessing the message, the messaging system may present a notification to a sender of the message. For example, the notification may identify the one or more recipients that have opened or otherwise accessed the message.

FIG. 1 is a block diagram showing an example messaging system 100 for exchanging data (e.g., messages and associated content) over a network. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a messaging system 124. The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
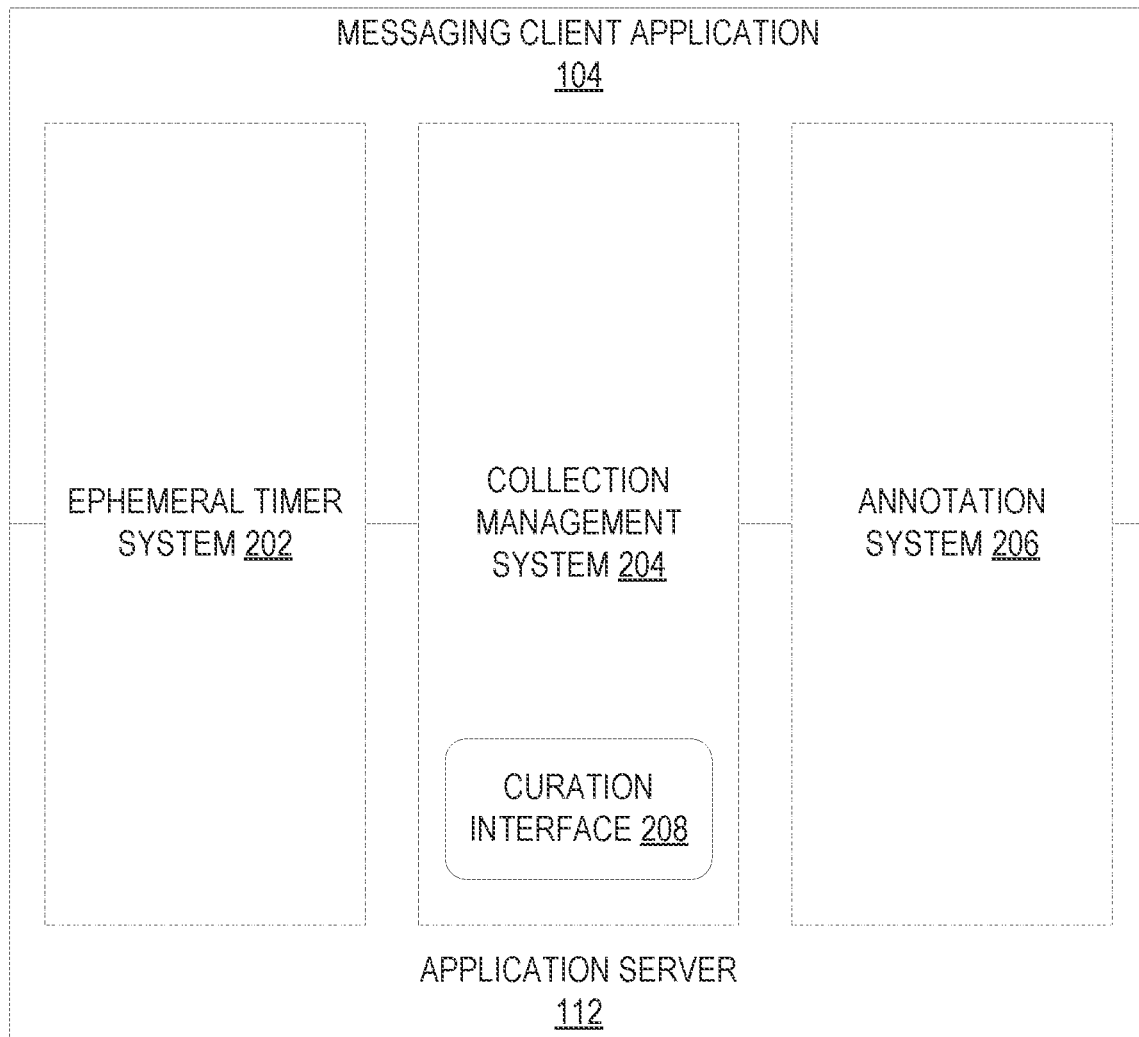
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models and image filters. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
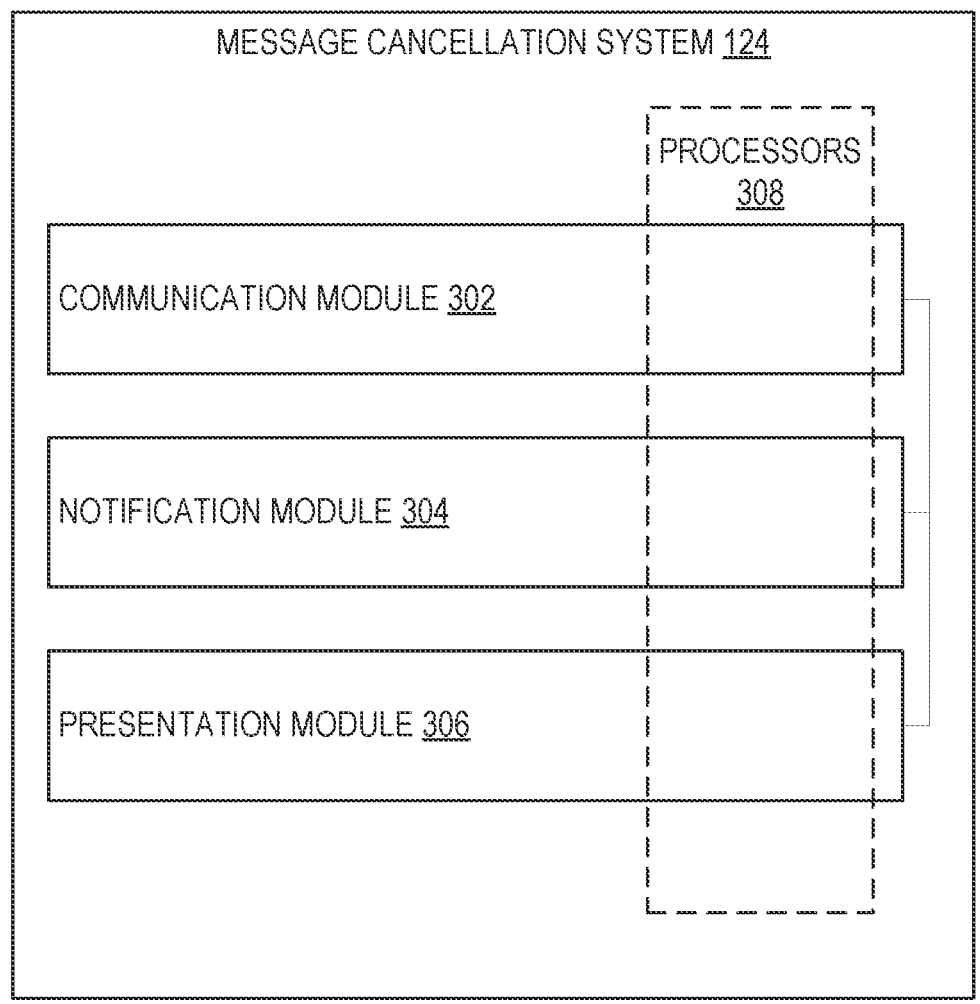
FIG. 3 is a block diagram illustrating various modules of a messaging system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the messaging system 124 that configure the messaging system 124 to perform operations that include: receiving a request to generate a message at a first client device; causing display of a message notification within an interface of a second client device, wherein the message was addressed to a recipient of the second client device; receiving a request to un-send the message from the first client device; and removing the message notification from the interface at the second client device in response to the request to un-send the message, according to some example embodiments. The messaging system 124 is shown as including a communication module 302, a notification module 304, and a presentation module 306, all configured to communicate with each other (e.g., via a bus, shared memory, or a switch). Any one or more of these modules may be implemented using one or more processors 308 (e.g., by configuring such one or more processors to perform functions described for that module) and hence may include one or more of the processors 308.

Any one or more of the modules described may be implemented using hardware alone (e.g., one or more of the processors 308 of a machine) or a combination of hardware and software. For example, any module described of the messaging system 124 may physically include an arrangement of one or more of the processors 308 (e.g., a subset of or among the one or more processors of the machine) configured to perform the operations described herein for that module. As another example, any module of the messaging system 124 may include software, hardware, or both, that configure an arrangement of one or more processors 308 (e.g., among the one or more processors of the machine) to perform the operations described herein for that module. Accordingly, different modules of the messaging system 124 may include and configure different arrangements of such processors 308 or a single arrangement of such processors 308 at different points in time. Moreover, any two or more modules of the messaging system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 4:
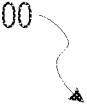
FIG. 4 is a flowchart illustrating a method for "un-sending" a message, according to certain example embodiments.

FIG. 4 is a flowchart illustrating a method 400 for un-sending a message, according to certain example embodiments. Operations of the method 400 may be performed by the modules described above with respect to FIG. 3. As shown in FIG. 4, the method 400 includes one or more operations 402, 404, 406, 408, and 410.

At operation 402, the communication module 302 receives a message generated by a first client device (e.g., the client device 102A), wherein the message is addressed to one or more recipients that include a second client device (e.g., the client device 102B). For example, the message may comprise device addresses (e.g., phone numbers, email addresses, user identifiers) of the one or more recipients such as the client device 102B, as well as message content that includes media content such as images, videos, audio files, and text data.

At operation 404, in response to the request to generate the message from the first client device, the notification module 304 causes display of a message notification within a messaging interface presented to each of the one or more recipients. For example, a messaging interface displayed at the second client device (e.g., client device 102B) may include a presentation of one or more messages received at the second client device. In some embodiments, the presentation of the one or more messages comprises a display of a message identifier, as well as an indication of a time and date in which the message was received, and an indication of a sender of the message.

At operation 406, the messaging system 124 receives a request to un-send the message from the first client device. In some embodiments, the request to un-send the message may include an identification of at least a portion of the one or more recipients that received the message, wherein the portion of the one or more recipients includes the second client device.

For example, a messaging interface displayed at the first client device (e.g., client device 102A), may comprise a presentation of a set of messages, and include a message identifier that corresponds to the message sent to the one or more client device. A user of the client device 102A may provide an input that selects the message identifier in order to furnish a request to un-send the message.

At operation 408, in response to receiving the request to un-send the message from the first client device, the presentation module 306 removes the message notification from the interface presented to the portion of the one or more recipients, including the interface presented at the second client device.

In some embodiments, the notification module 304 may cause display of a message cancellation notification to the portion of the one or more recipients identified by the user in the request to un-send the message, wherein the message cancellation notification includes an identification of the user of the first device, and an indication that a message was cancelled. For example, the message cancellation notification may indicate, "User has un-sent a message."

FIG. 5 is a flowchart illustrating a method 500 for un-sending a message, according to certain example embodiments. Operations of the method 500 may be performed by the modules described above with respect to FIG. 3. As shown in FIG. 5, the method 500 includes one or more operations 502 and 504.

At operation 502, the communication module 302 stores the message generated at the first client device at a memory location associated with the second client device at a server (e.g., database server 118). For example, in response to the operation 402 of the method 400, wherein the communication module 302 receives the request to generate the message from the first client device, the communication module 302 may identify one or more recipients of the message based on the request to generate the message, and store the message at memory locations associated with the one or more recipients at the database server 118.

At operation 504, in response to receiving the request to un-send the message from the first client device at operation 406 of the method 400, the communication module 302 deletes the message that corresponds with the message notification from the memory location associated with the one or more recipients at the database server 118, thereby eliminating access to the message from the one or more recipients.

FIG. 6 is a flowchart illustrating a method 600 for un-sending a message, according to certain example embodiments. Operations of the method 600 may be performed by the modules described above with respect to FIG. 3. As shown in FIG. 6, the method 600 includes one or more operations 602 and 604.

At operation 602, in response to receiving the request to generate the message from the first client device in operation 402 of the method 400, the presentation module 306 causes display of a message notification that includes a message identifier that identifies the message at a position among a set of messages within a message interface presented at the first client device. The message identifier may for example include an indication of a time in which a message was sent, as well as in indication of message content and an identification of recipients of the message, and whether or not the message had been opened by one or more of the recipients.

The communication module 302 receives the request to un-send the message, wherein the request to un-send the message includes a selection of the message notification that identifies the message, and an identification of at least a portion of the one or more recipients of the message. In response to receiving the request to un-send the message, at operation 604 the presentation module 306 removes the message notification that corresponds to the message from a position among the set of messages displayed within the message interface.

At operation 606, in response to the removing the message notification from the position among the set of messages within the messaging interface, the notification module 304 causes display of a second message notification among the set of messages within the message interface, wherein the second message notification comprises an indication that a message was deleted.

In some embodiments, the presentation module 306 may adjust a display of the set of messages to displace the message notification, upon receiving the request to remove the message notification. For example, the presentation module 306 may shift the set of messages up or down such that a position of the message notification is occupied by one or more remaining messages among the set of messages.

Figure 7:
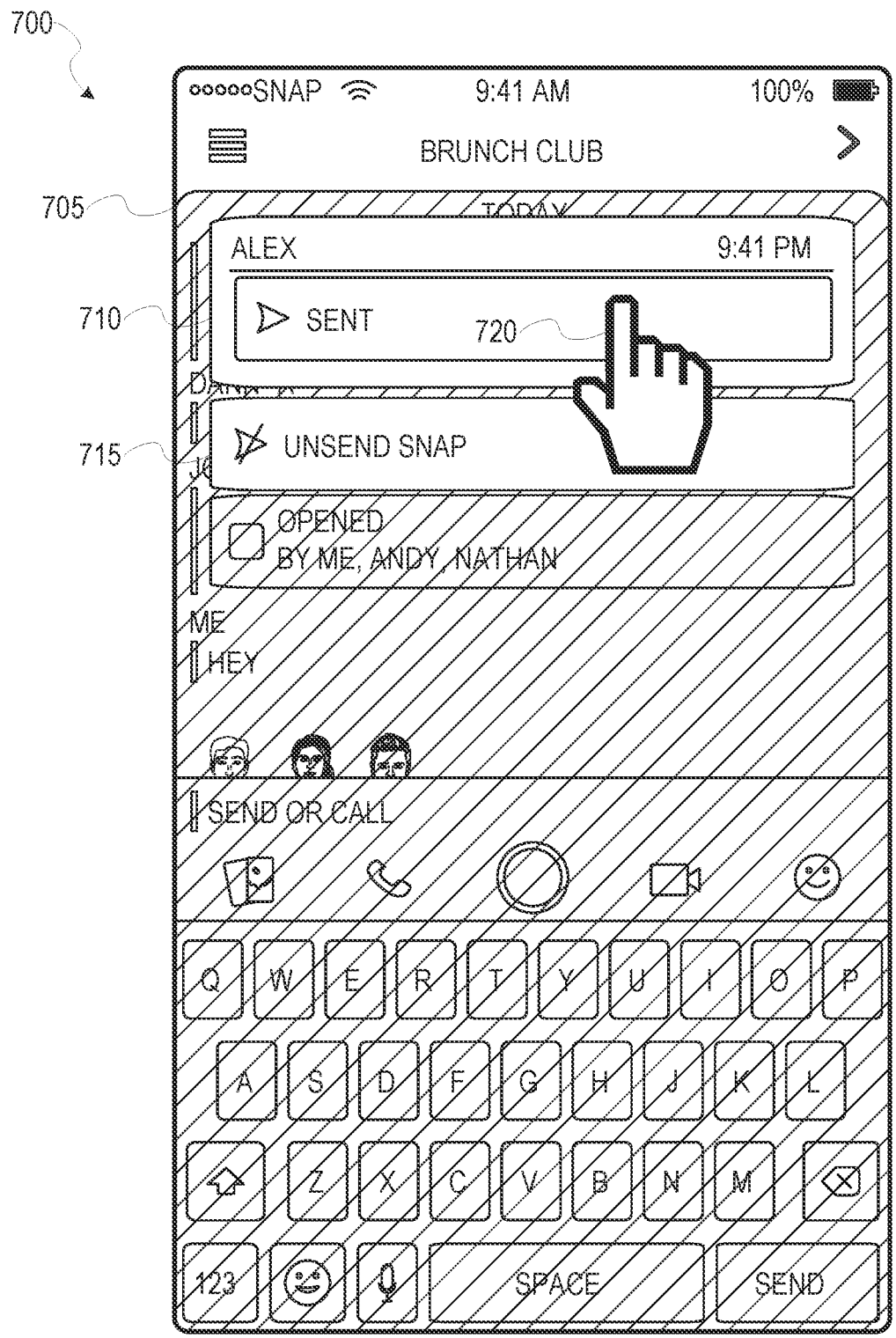
FIG. 7 is an interface diagram depicting a messaging interface, according to certain example embodiments.

FIG. 7 is an interface diagram 700 depicting a messaging interface 705, according to certain example embodiments, and as discussed in the methods 400, 500, and 600, as depicted in FIGS. 4-6. As seen in FIG. 7, the messaging interface 705 comprises a presentation of a set of messages that include the message 710. The messaging interface 705 may be presented at a sending device (e.g., client device 102A).

For example, a user of the client device 102A may provide a request through the messaging interface 705 to generate the message 710. The user may provide addresses of one or more recipients, and message content to be delivered to the one or more recipients via the message. In response to the request, the communication module 302 generates the message 710, and causes display of the message 710 within a messaging interface 705 to each of the one or more recipients, as well as at the client device 102A.

As discussed in the method 600 of FIG. 6, the user may select the message 710 (e.g., using the cursor 720), and in response, the presentation module 306 may generate and cause display of one or more messaging options, such as the messaging option 715. As seen in FIG. 7, the messaging option 715 may comprise a request to un-send the corresponding message (e.g., message 710).

For example, in response to receiving the selection of the message identifier of the message, the presentation module 306 may generate and cause display of a set of messaging options such as messaging option 715, wherein the set of messaging options including an option to un-send the message. In some embodiments, the user may select the option to un-send the message, and in response, the presentation module 306 may display a selectable list of the one or more recipients of the message, wherein the user may identify a portion of the one or more recipients. In this way, a user may choose to un-send the message 710 to some or all of the one or more recipients, by selecting a portion of the one or more recipients from among the presentation of the selectable list of user identifiers.

Figure 8:
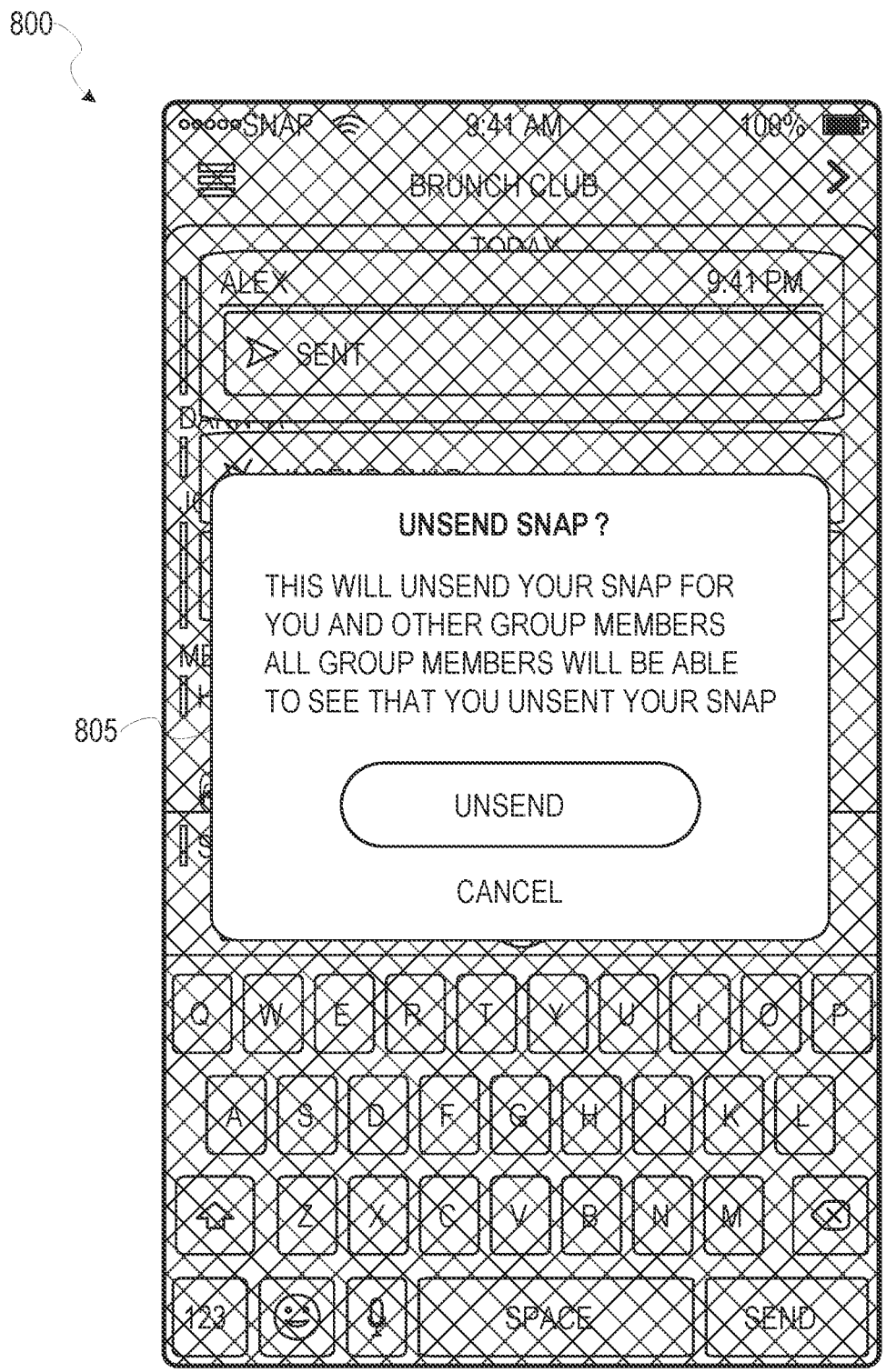
FIG. 8 is an interface diagram depicting a messaging interface, according to certain example embodiments.

FIG. 8 is an interface diagram 800 depicting a messaging interface 805, according to certain example embodiments, and as discussed in the methods 400, 500, and 600, as depicted in FIGS. 4-6. As seen in FIG. 8, the messaging interface 805 comprises a presentation of a confirmation request 805. For example, in response to receiving the request to un-send the message, as described in operation 406 of the method 400, and operation 604 of the method 600, the notification module 304 may cause display of the confirmation request 805 at the client device 102A. The user may provide a confirmation of the request to un-send the message through the confirmation request 805, and in response, the presentation module 306 may remove the message notification corresponding to the message from the one or more recipient devices (e.g., the client device 102B).

FIG. 9 is an interface diagram 900 depicting a messaging interface 905A, and a messaging interface 905B, according to certain example embodiments, and as discussed in the methods 400, 500, and 600, as depicted in FIGS. 4-6.

The messaging interface 905A depicts a messaging interface that includes the message 910, displayed at a recipient device of the message notification (e.g., the client device 102B). For example, the message 910 may include an address that identifies the client device 102B.

The messaging interface 905B depicts a messaging interface subsequent to removing the message 910, as in operation 408 of the method 400. In some example embodiments, the notification module 304 may additionally cause display of the notification 915, wherein the notification 915 comprises an indication that a user has unsent a message (e.g., the message 910).

In some embodiments, the communication module 302 may determine a message status of the message, wherein the message status includes an indication of whether or not each of the one or more recipients have opened or otherwise accessed the message. In such embodiments, the presentation module 306 may present the message status of the message within the messaging options. For example, the list of the one or more recipients may include an indication of which recipients from among the one or more recipients have accessed or otherwise opened the message (e.g., recipients that opened the message may be presented in a first color, and recipients that have not opened or accessed the message may be presented in a second color).

Software Architecture

Figure 10:
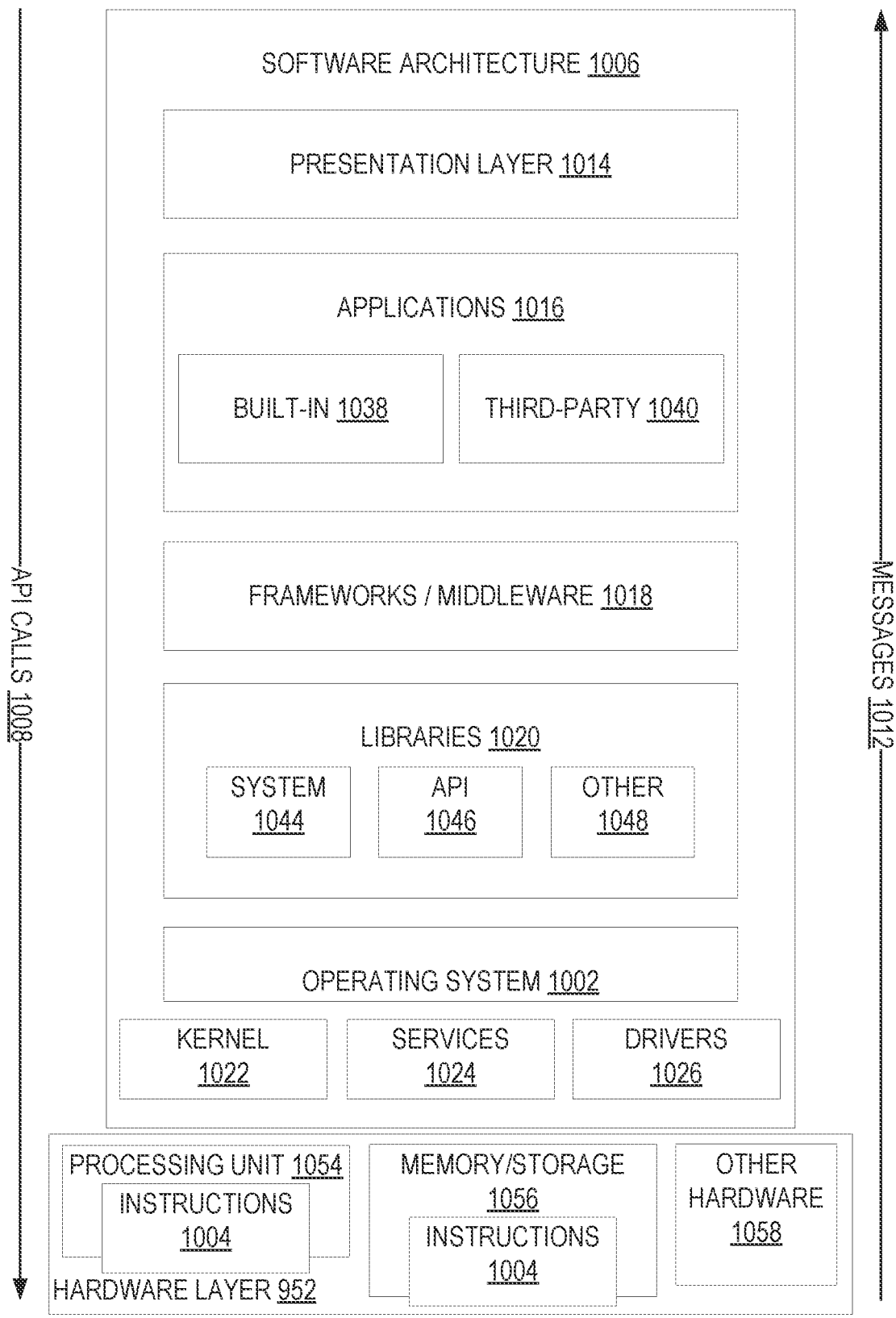
FIG. 10 is a block diagram illustrating a representative software architecture, which may be used in conjunction with various hardware architectures herein described and used to implement various embodiments.

FIG. 10 is a block diagram illustrating an example software architecture 1006, which may be used in conjunction with various hardware architectures herein described. FIG. 10 is a non-limiting example of a software architecture and it will be appreciated that many other architectures may be implemented to facilitate the functionality described herein. The software architecture 1006 may execute on hardware such as machine 1100 of FIG. 11 that includes, among other things, processors 1104, memory 1114, and I/O components 1118. A representative hardware layer 1052 is illustrated and can represent, for example, the machine 1000 of FIG. 10. The representative hardware layer 1052 includes a processing unit 1054 having associated executable instructions 1004. Executable instructions 1004 represent the executable instructions of the software architecture 1006, including implementation of the methods, components and so forth described herein. The hardware layer 1052 also includes memory and/or storage modules memory/storage 1056, which also have executable instructions 1004. The hardware layer 1052 may also comprise other hardware 1058.

In the example architecture of FIG. 10, the software architecture 1006 may be conceptualized as a stack of layers where each layer provides particular functionality. For example, the software architecture 1006 may include layers such as an operating system 1002, libraries 1020, applications 1016 and a presentation layer 1014. Operationally, the applications 1016 and/or other components within the layers may invoke application programming interface (API) API calls 1008 through the software stack and receive a response as in response to the API calls 1008. The layers illustrated are representative in nature and not all software architectures have all layers. For example, some mobile or special purpose operating systems may not provide a frameworks/middleware 1018, while others may provide such a layer. Other software architectures may include additional or different layers.

The operating system 1002 may manage hardware resources and provide common services. The operating system 1002 may include, for example, a kernel 1022, services 1024 and drivers 1026. The kernel 1022 may act as an abstraction layer between the hardware and the other software layers. For example, the kernel 1022 may be responsible for memory management, processor management (e.g., scheduling), component management, networking, security settings, and so on. The services 1024 may provide other common services for the other software layers. The drivers 1026 are responsible for controlling or interfacing with the underlying hardware. For instance, the drivers 1026 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1020 provide a common infrastructure that is used by the applications 1016 and/or other components and/or layers. The libraries 1020 provide functionality that allows other software components to perform tasks in an easier fashion than to interface directly with the underlying operating system 1002 functionality (e.g., kernel 1022, services 1024 and/or drivers 1026). The libraries 1020 may include system libraries 1044 (e.g., C standard library) that may provide functions such as memory allocation functions, string manipulation functions, mathematical functions, and the like. In addition, the libraries 1020 may include API libraries 1046 such as media libraries (e.g., libraries to support presentation and manipulation of various media format such as MPREG4, H.264, MP3, AAC, AMR, JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 1020 may also include a wide variety of other libraries 1048 to provide many other APIs to the applications 1016 and other software components/modules.

The frameworks/middleware 1018 (also sometimes referred to as middleware) provide a higher-level common infrastructure that may be used by the applications 1016 and/or other software components/modules. For example, the frameworks/middleware 1018 may provide various graphic user interface (GUI) functions, high-level resource management, high-level location services, and so forth. The frameworks/middleware 1018 may provide a broad spectrum of other APIs that may be utilized by the applications 1016 and/or other software components/modules, some of which may be specific to a particular operating system 1002 or platform.

The applications 1016 include built-in applications 1038 and/or third-party applications 1040. Examples of representative built-in applications 1038 may include, but are not limited to, a contacts application, a browser application, a book reader application, a location application, a media application, a messaging application, and/or a game application. Third-party applications 1040 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1040 may invoke the API calls 1008 provided by the mobile operating system (such as operating system 1002) to facilitate functionality described herein.

The applications 1016 may use built in operating system functions (e.g., kernel 1022, services 1024 and/or drivers 1026), libraries 1020, and frameworks/middleware 1018 to create user interfaces to interact with users of the system. Alternatively, or additionally, in some systems interactions with a user may occur through a presentation layer, such as presentation layer 1014. In these systems, the application/component "logic" can be separated from the aspects of the application/component that interact with a user.

Figure 11:
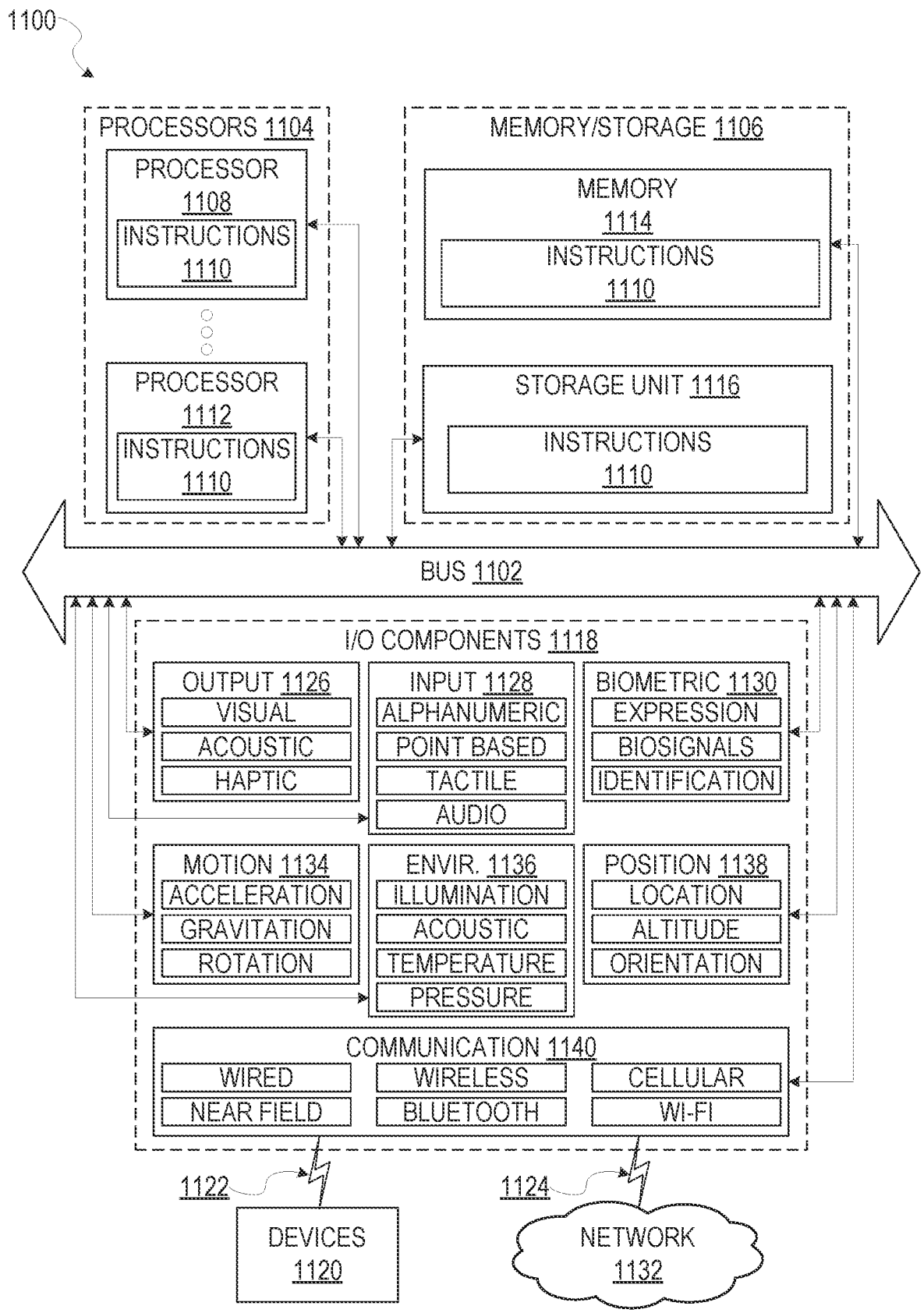
FIG. 11 is a block diagram illustrating components of a machine, according to some example embodiments, able to read instructions from a machine-readable medium (e.g., a machine-readable storage medium) and perform any one or more of the methodologies discussed herein.

FIG. 11 is a block diagram illustrating components of a machine 1100, according to some example embodiments, able to read instructions from a machine-readable medium (e.g., a machine-readable storage medium) and perform any one or more of the methodologies discussed herein. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein may be executed. As such, the instructions 1110 may be used to implement modules or components described herein. The instructions 1110 transform the general, non-programmed machine 1100 into a particular machine 1100 programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1110, sequentially or otherwise, that specify actions to be taken by machine 1100. Further, while only a single machine 1100 is illustrated, the term "machine" shall also be taken to include a collection of machines that individually or jointly execute the instructions 1110 to perform any one or more of the methodologies discussed herein.

The machine 1100 may include processors 1104, memory memory/storage 1106, and I/O components 1118, which may be configured to communicate with each other such as via a bus 1102. The memory/storage 1106 may include a memory 1114, such as a main memory, or other memory storage, and a storage unit 1116, both accessible to the processors 1104 such as via the bus 1102. The storage unit 1116 and memory 1114 store the instructions 1110 embodying any one or more of the methodologies or functions described herein. The instructions 1110 may also reside, completely or partially, within the memory 1114, within the storage unit 1116, within at least one of the processors 1104 (e.g., within the processor's cache memory), or any suitable combination thereof, during execution thereof by the machine 1100. Accordingly, the memory 1114, the storage unit 1116, and the memory of processors 1104 are examples of machine-readable media.

The I/O components 1118 may include a wide variety of components to receive input, provide output, produce output, transmit information, exchange information, capture measurements, and so on. The specific I/O components 1118 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1118 may include many other components that are not shown in FIG. 11. The I/O components 1118 are grouped according to functionality merely for simplifying the following discussion and the grouping is in no way limiting. In various example embodiments, the I/O components 1118 may include output components 1126 and input components 1128. The output components 1126 may include visual components (e.g., a display such as a plasma display panel (PDP), a light emitting diode (LED) display, a liquid crystal display (LCD), a projector, or a cathode my tube (CRT)), acoustic components (e.g., speakers), haptic components (e.g., a vibratory motor, resistance mechanisms), other signal generators, and so forth. The input components 1128 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 1118 may include biometric components 1130, motion components 1134, environmental environment components 1136, or position components 1138 among a wide array of other components. For example, the biometric components 1130 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1134 may include acceleration sensor components (e.g., accelerometer), gravitation sensor components, rotation sensor components (e.g., gyroscope), and so forth. The environment components 1136 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1138 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1118 may include communication components 1140 operable to couple the machine 1100 to a network 1132 or devices 1120 via coupling 1122 and coupling 1124 respectively. For example, the communication components 1140 may include a network interface component or other suitable device to interface with the network 1132. In further examples, communication components 1140 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1120 may be another machine or any of a wide variety of peripheral devices (e.g., a peripheral device coupled via a Universal Serial Bus (USB)).

Moreover, the communication components 1140 may detect identifiers or include components operable to detect identifiers. For example, the communication components 1140 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1140, such as, location via Internet Protocol (IP) geo-location, location via Wi-Fi® signal triangulation, location via detecting a NFC beacon signal that may indicate a particular location, and so forth.

GLOSSARY

"CARRIER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi@ network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
receiving a first request to send a message to a plurality of users from a first client device, the plurality of users including a user that corresponds with a user identifier;
presenting a message notification at the first client device based on the first request to send the message, the message notification including an indication of the plurality of users;
causing display of a presentation of a message within a messaging interface at a second client device associated with the user identifier based on the first request to send the message;
receiving, from the first client device, an input that selects the message notification;
causing display of a menu element at the first client device responsive to the input that selects the notification, the menu element including a display of one or more messaging options that include an option to un-send the message;
receiving an input that selects the display of the option to un-send the message;
presenting a selectable list of a set of user identifiers that correspond with the plurality of users associated with the message responsive to the input that selects the display of the option;
receiving, from the first client device, a second request that comprises a selection of the user identifier from the selectable list;
causing the second client device associated with the user identifier to remove the message from the messaging interface based on the second request received from the first client device; and
causing display of a notification at the second client device based on the second request, the notification including an identifier associated with the first client device.

2. The method of claim 1, wherein the causing the second client device associated with the user to remove the message from the messaging interface further comprises:
deleting the message from a memory location associated with the second client device within a server in response to the receiving the selection of the user identifier associated with the user.

3. The method of claim 1, wherein the message comprises media content.

4. The method of claim 1, wherein the selection identifies a plurality of user identifiers that include the user identifier that corresponds with the user.

5. The method of claim 4, wherein the causing the second client device associated with the user to remove the message from the messaging interface responsive to the selection further comprises:
causing a plurality of devices associated with the plurality of user identifiers to remove the message from corresponding messaging interfaces.

6. The method of claim 1, wherein the message is a first message, the messaging interface comprises a plurality of messages, wherein the presentation of the message is at a position among the plurality of messages, and wherein the causing the second client device associated with the user to remove the message from the messaging interface further comprises:
causing display of a second message at the position of the presentation of the message among the plurality of messages.

7. The method of claim 1, wherein the user identifier comprises a graphical icon.

8. A system comprising:
a memory; and
at least one hardware processor coupled to the memory and comprising instructions that causes the system to perform operations comprising:
receiving a first request to send a message to a plurality of users from a first client device, the plurality of users including a user that corresponds with a user identifier;
presenting a message notification at the first client device based on the first request to send the message, the message notification including an indication of the plurality of users;
causing display of a presentation of a message within a messaging interface at a second client device associated with the user identifier based on the first request to send the message;

receiving, from the first client device, an input that selects the message notification;

causing display of a menu element at the first client device responsive to the input that selects the notification, the menu element including a display of one or more messaging options that include an option to un-send the message;

receiving an input that selects the display of the option to un-send the message;

presenting a selectable list of a set of user identifiers that correspond with the plurality of users associated with the message responsive to the input that selects the display of the option;

receiving, from the first client device, a second request that comprises a selection of the user identifier from the selectable list;

causing the second client device associated with the user identifier to remove the message from the messaging interface based on the second request received from the first client device; and causing display of a notification at the second client device based on the second request, the notification including an identifier associated with the first client device.

9. The system of claim 8, wherein the causing the second client device associated with the user to remove the message from the messaging interface further comprises:

deleting the message from a memory location associated with the second client device within a server in response to the receiving the selection of the user identifier associated with the user.

10. The system of claim 8, wherein the message comprises media content.

11. The system of claim 8, wherein the selection identifies a plurality of user identifiers that include the user identifier that corresponds with the user.

12. The system of claim 11, wherein the causing the second client device associated with the user to remove the message from the messaging interface responsive to the selection further comprises:

causing a plurality of devices associated with the plurality of user identifiers to remove the message from corresponding messaging interfaces.

13. The system of claim 8, wherein the message is a first message, the messaging interface comprises a plurality of messages, wherein the presentation of the message is at a position among the plurality of messages, and wherein the causing the second client device associated with the user to remove the message from the messaging interface further comprises:

causing display of a second message at the position of the presentation of the message among the plurality of messages.

14. The system of claim 8, wherein the user identifier comprises a graphical icon.

15. A non-transitory machine-readable storage medium comprising instructions that, when executed by one or more processors of a machine, cause the machine to perform operations comprising:

receiving a first request to send a message to a plurality of users from a first client device, the plurality of users including a user that corresponds with a user identifier;

presenting a message notification at the first client device based on the first request to send the message, the message notification including an indication of the plurality of users;

causing display of a presentation of a message within a messaging interface at a second client device associated with the user identifier based on the first request to send the message;

receiving, from the first client device, an input that selects the message notification;

causing display of a menu element at the first client device responsive to the input that selects the notification, the menu element including a display of one or more messaging options that include an option to un-send the message;

receiving an input that selects the display of the option to un-send the message;

presenting a selectable list of a set of user identifiers that correspond with the plurality of users associated with the message responsive to the input that selects the display of the option;

receiving, from the first client device, a second request that comprises a selection of the user identifier from the selectable list;

causing the second client device associated with the user identifier to remove the message from the messaging interface based on the second request received from the first client device; and causing display of a notification at the second client device based on the second request, the notification including an identifier associated with the first client device.

16. The non-transitory machine-readable storage medium of claim 15, wherein the causing the second client device associated with the user to remove the message from the messaging interface further comprises:

deleting the message from a memory location associated with the second client device within a server in response to the receiving the selection of the user identifier associated with the user.

17. The non-transitory machine-readable storage medium of claim 15, wherein the message comprises media content.

18. The non-transitory machine-readable storage medium of claim 15, wherein the selection identifies a plurality of user identifiers that include the user identifier that corresponds with the user.

19. The non-transitory machine-readable storage medium of claim 18, wherein the causing the second client device associated with the user to remove the message from the messaging interface responsive to the selection further comprises:

causing a plurality of devices associated with the plurality of user identifiers to remove the message from corresponding messaging interfaces.

20. The non-transitory machine-readable storage medium of claim 15, wherein the message is a first message, the messaging interface comprises a plurality of messages, wherein the presentation of the message is at a position among the plurality of messages, and wherein the causing the second client device associated with the user to remove the message from the messaging interface further comprises:

causing display of a second message at the position of the presentation of the message among the plurality of messages.

\* \* \* \* \*